C. BERG.
FLY TRAP.
APPLICATION FILED FEB. 9, 1915.

1,201,796.

Patented Oct. 17, 1916.

Witnesses
A. V. Doyle
M. E. Laughlin

Inventor
Carl Berg,
By Victor J. Evans,
Attorney

UNITED STATES PATENT OFFICE.

CARL BERG, OF BROOKLYN, NEW YORK, ASSIGNOR TO THE BERG & BEARD MANUFACTURING COMPANY, INC., OF BROOKLYN, NEW YORK, A CORPORATION OF NEW YORK.

FLY-TRAP.

1,201,796.      Specification of Letters Patent.      Patented Oct. 17, 1916.

Application filed February 9, 1915. Serial No. 7,091.

*To all whom it may concern:*

Be it known that I, CARL BERG, a citizen of the United States, residing at Brooklyn, in the county of Kings and State of New York, have invented new and useful Improvements in Fly-Traps, of which the following is a specification.

The general object of this invention is to utilize an attractive and sticky substance, such as molasses candy, as a means for the trapping of insects, preferably flies and as a means for the instant destruction of the same after they have partaken of the candy. And to this end the invention resides in a tablet of sticky candy which has been impregnated with a suitable poison and in arranging the candy within a receptacle, open at one end, so that a guard is provided for preventing the hands of persons from contacting with the candy when the article is in use.

Figure 1:
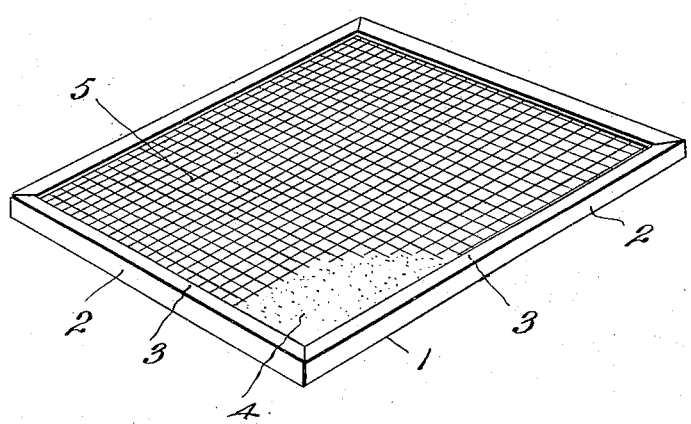
Figure 2:
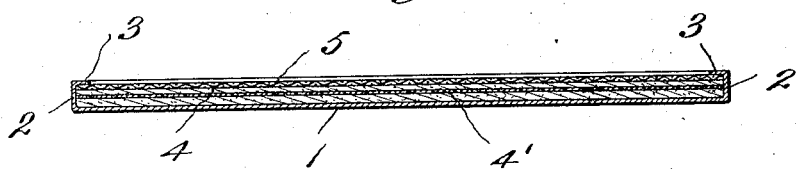

Other objects will appear and be better understood from that embodiment of my invention of which the following is a specification, reference being had to the accompanying drawings forming part hereof, in which:

Figure 1 is a perspective view of my invention with part of the screen broken away and Fig. 2 is a cross sectional view of the same.

The fly trap consists of a receptacle, preferably formed of a single metal sheet, having a bottom 1 and upright sides 2, the upper edges of which are bent inwardly as indicated at 3.

Within the receptacle is placed a relatively thin layer of poison bait 4, which may be made of a substance suitably adapted for the purpose, such as a poison sticky candy. In the present instance I have shown a tablet of molasses taffy impregnated with strychnin. This structure provides a tablet which will remain in a sticky state under normal weather conditions, and the tablet is arranged within the receptacle so that its upper surface is exposed to readily attract the flies. On account of the sticky quality of the candy it is obvious that the flies in alighting thereon will stick to the candy and that after partaking thereof they will be prevented from flying away to die in undesirable places. The candy completely fills the receptacle and is covered by a wire screen 5 which is provided for the purpose of retaining the candy within the receptacle and for acting as a guard to prevent persons, such as children, getting at the candy should the trap be carelessly thrown about.

To reinforce the candy, so as to prevent the parts from becoming separated, should the layer become broken, a thin layer of coarse and porous fabric 4' is provided. This fabric is preferably of the quality of burlap and is embedded within the central portion of the candy when the same is being formed into a layer of the required thickness.

By reason of the porosity of burlap it is obvious that when the candy is in a substantially molten state it will enter the pores of the burlap with the result that a relatively thin tablet of candy may be materially reinforced so as to reduce the liability of the tablet from becoming disintegrated in the event of fracture.

The edges 3 of the receptacle are bent inwardly so as to engage the marginal edges of the screen and thus firmly secure both the screen and the candy against displacement within the receptacle. The edges are substantially arranged in a plane with both the top surface of the candy and the screen so as to provide a tablet of a uniform thickness throughout. The advantages of a fly trap of this construction are numerous; as for instance no attention of an attendant is required other than to remove from time to time the dead flies that have accumulated on the top of the tablet and that by protecting the candy by the receptacle and the screen the tablet may be handled relatively carelessly without liability of endangering the candy.

What I claim as new is:—

1. In a poison tablet for flies and the like, the combination with a casing having a perforated cover; of a homogeneous mass of sweetened poisonous material arranged in the casing and in contact with the cover, said mass being characterized by having a low melting point, a relatively high degree of brittleness and by being dissoluble in water, and a reticulated strip of tough material embedded in and filled with the substance of the said mass whereby the mass is reinforced against disintegration by partial melting, dissolution or by accidental fracture.

2. A poison tablet for flies and the like, comprising a homogeneous mass of sweetened poisonous material characterized by having a low melting point, a relatively high degree of brittleness and by being dissoluble in water, and a flexible reticulated strip of tough material embedded in and filled with the substance of the said mass whereby the mass is reinforced against disintegration by partial melting, dissolution or by accidental fracture.

In testimony whereof I, affix my signature in presence of two witnesses.

CARL BERG.

Witnesses:
 JOHN A. DONEGAN,
 GEO. H. BYRNE.

Copies of this patent may be obtained for five cents each, by addressing the "Commissioner of Patents Washington, D. C."